Sept. 12, 1961 E. THOMAS 2,999,925

VARIABLE DECISION THRESHOLD COMPUTER

Filed Jan. 28, 1959 3 Sheets-Sheet 1

INVENTOR.
ELMER THOMAS
BY Albert H. Kirchner
ATTORNEY

Sept. 12, 1961 E. THOMAS 2,999,925

VARIABLE DECISION THRESHOLD COMPUTER

Filed Jan. 28, 1959 3 Sheets-Sheet 2

INVENTOR.
ELMER THOMAS

BY Albert H. Kirchner

ATTORNEY

VARIABLE DECISION THRESHOLD COMPUTER

Filed Jan. 28, 1959

INVENTOR.
ELMER THOMAS
BY Albert H. Kirchner
ATTORNEY

United States Patent Office 2,999,925

Patented Sept. 12, 1961

2,999,925

VARIABLE DECISION THRESHOLD COMPUTER

Elmer Thomas, Adelphi, Md., assignor to Page Communications Engineers, Inc., Washington, D.C., a corporation of Delaware Filed Jan. 28, 1959, Ser. No. 789,638
13 Claims. (Cl. 250—8)

This invention relates generally to frequency shift keying (FSK) receivers and to multiple level AM digital systems and more particularly to a new device useable with such receivers to modify the criteria for determining which of binary signals is being received by shifting the decision threshold, or the signal with respect to a fixed threshold, under changing conditions and upon fading of said signals.

In frequency shift type transmission, a mark is transmitted on one frequency and a space is transmitted on another frequency. The receiver may consist of dual filter channels, with one filter tuned to the mark frequency and the second filter tuned to the space frequency. The process of deciding whether a mark or space signal has been received, normally consists of determining which filter has the greater output. Where flat fading exists, this system performs well but results in a high error liability when deep fades occur on either frequency. In practice, mark and space amplitudes often are not equal due to propagation characteristics and disturbances, including interference, atmospherics, noise and fading, a fact which has been generally ignored when considering the decision process. At times, the error effects of these disturbances are so great as to render the elaborate receivers and highly directional diversity antennas constructed to minimize these effects virtually unserviceable.

Accordingly, it is a primary object of this invention to overcome or greatly minimize the error effects of propagation characteristics and disturbances in carrier type FSK transmission and particularly the effect of deep selective fading.

Another object of the invention is to provide a variable decision threshold computer which will shift the decision threshold, or the received signals with respect to a fixed decision level, upon variation of fading conditions to minimize the effects of noise and selective frequency fading on the decision process.

Still another object of the invention is to provide a variable decision threshold computer of the character indicated which sets an initial decision threshold such as to yield an output voltage substantially equal to and of the same sense as input signals of equal strength, shifts the decision threshold to a level substantially halfway between sequentially received input signals of unequal amplitude and different polarity, and returns the decision threshold to its initial level upon prolonged reception of a signal of one polarity.

A still further object of the invention is to provide a variable decision threshold computer of the character indicated which sets a fixed decision threshold but varies the decision criteria under changing conditions of signal reception in order to shift the signal with respect to the fixed threshold so that for sequential input signals of the same strength, output voltages of corresponding strength and polarity are yielded; for input signals of different value, output voltages proportional to the difference in amplitude of sequential input signals are yielded; and for a prolonged input signal of one polarity, an output voltage substantially equal to the input voltage and of the same polarity is yielded.

Yet another object of the invention is to provide a variable decision threshold computer of the character indicated which involves simple circuits and circuit elements which may be inexpensively added to receivers without excessive complication of equipment.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Figure 1:
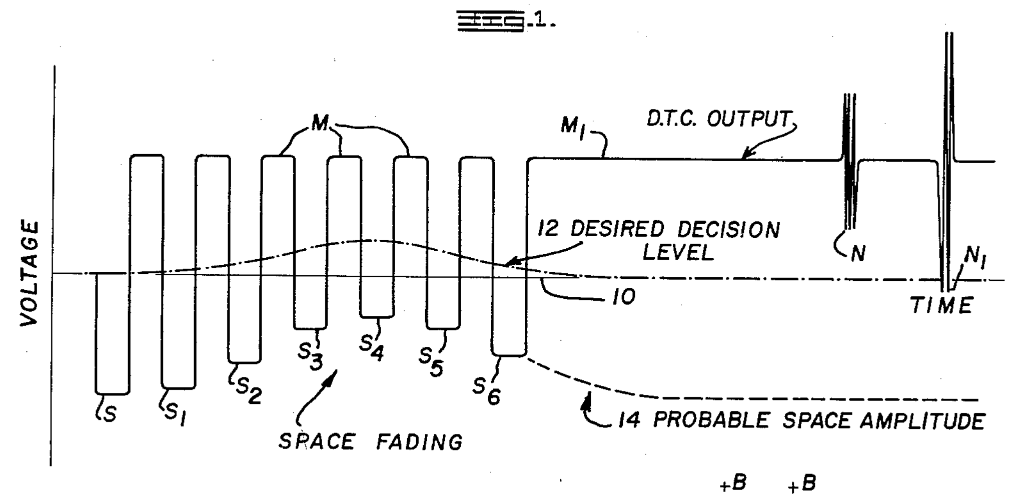
FIG. 1 is a voltage time diagram explaining the action of a decision threshold computer according to the invention which shifts the decision threshold.

Referring now to the drawings, FIG. 1 illustrates the action of a computer according to the invention with respect to demodulated mark and space signals having a bit length which may vary from microseconds to 20 milliseconds or more. The mark signals M and $M_1$ are assumed to be of constant voltage or amplitude while $M_1$ is a prolonged signal of many bit lengths such as frequently occurs in the transmission of data or messages. The space signals S—$S_4$ are indicated as being of opposite sense or polarity to the mark signals and of fading intensity. Space signals $S_5$ and $S_6$ are increasing in intensity. Normally, the axis 10, centrally disposed between the equal amplitude signals M and S, is the decision threshold for determination of whether the received signal, including superimposed noise, interference and other effects, is a mark or space. If therefore, a noise peak superimposed on space bit $S_5$ were to cross the threshold 10, the normal receiver would erroneously indicate the reception of a mark signal. Consequently, it would be extremely desirable, as long as marks and spaces are being received in reasonable alternate sequence, to lift the decision threshold to the broken line 12 which follows the fading space signals and is disposed substantially halfway between sequential mark and space amplitudes. When a prolonged mark signal $M_1$ is received and the space signal is completely absent, it is desirable to return the decision threshold 12 to its initial level 10 (where marks and spaces are of equal amplitude). This returns the decision standard or criteria of judgment to an FSK decision rather than an amplitude decision, and is desirable in that the noise peaks required to yield an erroneous decision would be much greater. Thus, noise peaks N would not cross the decision threshold at the level 10, but noise peaks $N_1$ of greater intensity would cross the new threshold and result in an erroneous decision. The shifting of the decision threshold from 12 to 10 thus assumes a probable space amplitude along the broken line 14 though the space signal is completely absent.

Figure 2:
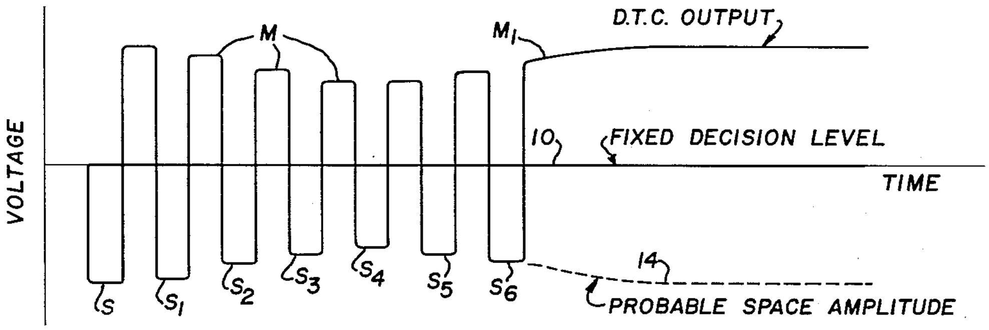
FIG. 2 is a diagram similar to FIG. 1 explaining the action of another embodiment of the invention which shifts the signal relative to a fixed decision threshold to accomplish the same results.

Instead of shifting the decision threshold level under changing conditions of reception, the same beneficial results may be obtained by shifting the signals with respect to a fixed decision level. This is illustrated in FIG. 2 wherein the initial decision threshold 10 between equal signals M and S is selected as the fixed decision threshold. Under conditions of constant mark signals and fading space signals $S_1$—$S_4$, the sequential signals are shown as shifted to center about the fixed decision threshold 10. When, however, a prolonged signal $M_1$ is received, the signal is shifted completely to a position at one side of the decision level. The output $E_O$ of a device for accomplishing such signal shifts would be expressed as follows in terms of signal voltage inputs $E_M$ for mark and $E_S$ for space:

Initially (mark and space amplitudes being equal), $E_O=E_M$ or $-E_S$.

Under fading conditions of one or both types of input signals, the shifted output voltage may be expressed as half the difference of adjacent sequential input signals of opposite polarity, or $E_O=\frac{1}{2}(E_M+E_S)$.

Under reception of a prolonged signal of one type, the output voltage is shifted so that $E_M=E_{M1}$ or corresponding space voltage of negative polarity.

Figure 3:
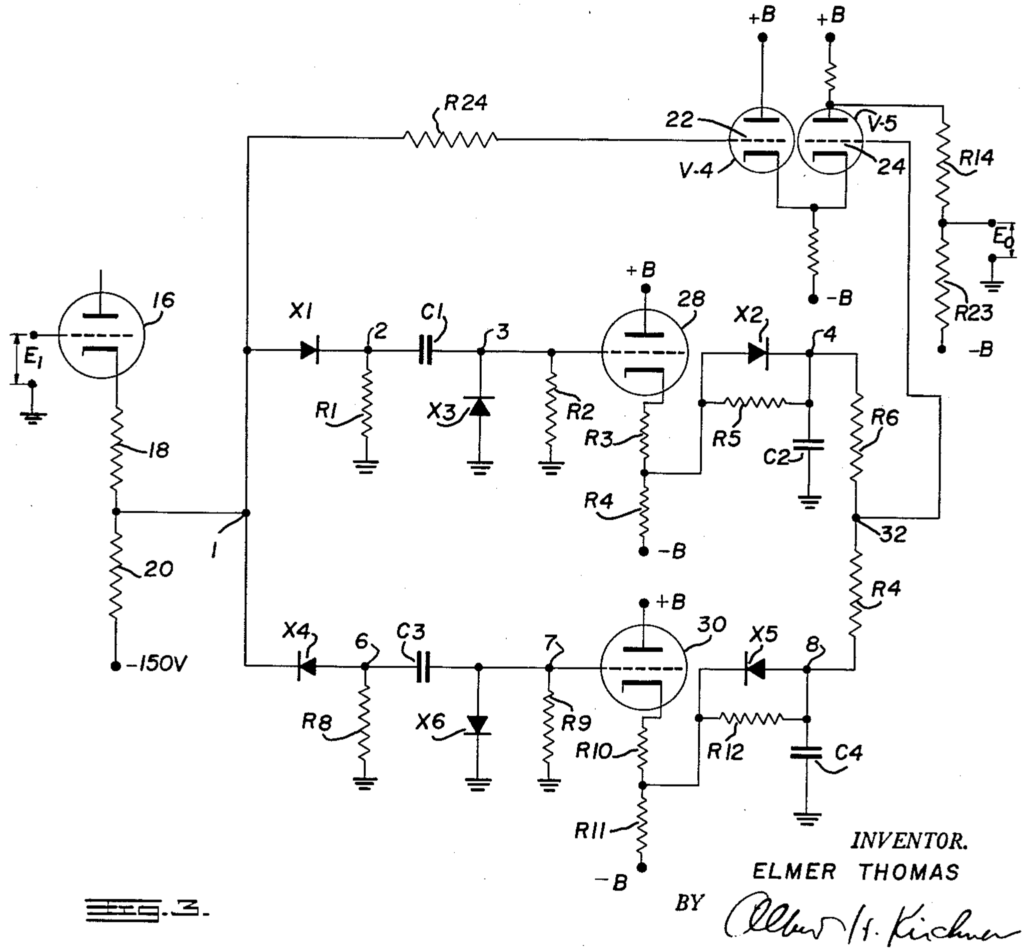
FIG. 3 is a schematic circuit of a decision threshold computer which will function in the manner illustrated in FIG. 1.
Figure 4:
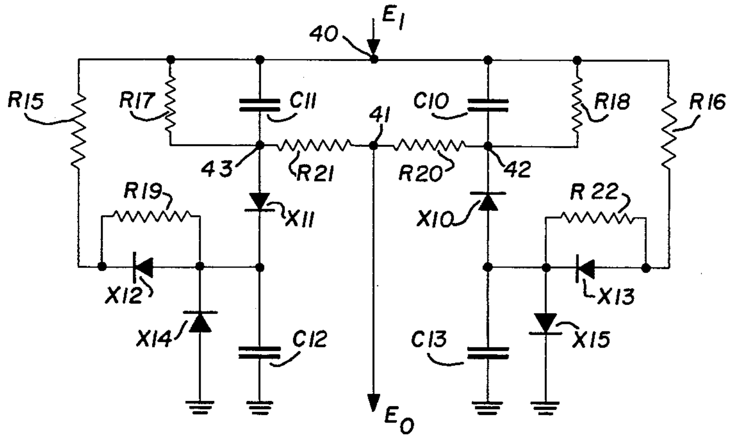
FIG. 4 is a schematic circuit of a decision threshold computer which will function in the manner illustrated in FIG. 2.

In FIGS. 3 and 4 are schematically illustrated the circuits of devices which will shift the decision threshold, or the signal with respect to a fixed threshold, under varying conditions of reception in accordance with the diagram of FIGS. 1 and 2. Such a device, in its varying embodiments as will be described hereinafter, is termed a decision threshold computer regardless of whether it shifts the threshold or the signal since in either case the resulting output is the same. The decision threshold is defined as that level which distinguishes between binary signals, those signals exceeding the level yielding an output of one binary type, and those signals less than the level yielding an output of the opposite binary type.

The decision threshold computer of FIG. 3 corresponds in function to the diagram of FIG. 1. The computer comprises an input cathode follower 16 (for impedance matching to prevent loading of the input circuit by the computer), two similar parallel diode circuits between 1 and 32 and a differential amplifier V4 and V5. The input waveform, for which this circuit is designed, consists of combined mark and space filter outputs where the mark filter output is assumed to be positive and the space filter output is assumed to be negative. One of the similar parallel circuits comprises the rectifier X1, capacitor C1, grid cathode impedance of tube 28, diode X2, and resistor R6. The other parallel circuit comprises the equal value elements X4, C3, tube 30, X5 and R4. The rectifiers of one circuit X1, X2 are reversed with respect to those of the other, X4 and X5. Resistor R1 is connected between X1 and C1 at point 2 to ground. Rectifier X3 and resistor R2 in parallel are connected between C1 and tube 28 at point 3 to ground. Rectifier X2 is bridged by resistor R5. Capacitor C2 is connected between rectifier X2 and resistor R6 at point 4 to ground. Elements R8, X6, R9, R12 and C4 are similarly added to the second branch of the parallel circuits. The values of the capacitors and resistors are chosen to provide quick charge time constants shorter than the bit intervals and relatively slow discharge time constants in the order of approximately 75 milliseconds for 50 mc. ionospheric scatter transmission. This enables the computer to follow signal fading without appreciable phase lag.

The input signal is applied to the grid of a cathode follower consisting of tube 16 and resistors 18 and 20. The output of the cathode follower, obtained at the junction of 18 and 20 is applied to the diode circuits, X1 and R1, and X4 and R8 respectively and to the input of differential amplifier V4, V5 and associated components. The output of the differential amplifier is taken at the connection point of resistors R14 and R23 in the plate circuit of tube V5. The function of diodes X1 and X4 is to separate the mark or positive going signals from the space or negative going signals. Diode X1 with resistor R1 passes only the positive going portion of the input signal. As long as the signal alternates between mark and space, at a rate high compared to the low frequency cutoff characteristics of C1 and R2, C1 will be discharged by X3. Thus, for the above condition, the signal appearing at point 3 will be identical to that appearing at point 2. If the signal remains in a steady marking condition, capacitor C1 will charge through diode X1 and resistor R2 to a voltage equal and opposite to the input and zero volts will result at the grid of tube 28. Network X2, R5 and C2 is a peak detecting and smoothing circuit so that the voltage appearing at point 4 is equal to the peak of the mark, or positive going, signal where alternations are occuring between mark and space. For a steady mark or positive voltage, point 4 will ultimately decay to zero as a result of the combined effect of the charging of C1 and the discharging of C2 through resistor R5.

A similar action takes place in the adjacent parallel circuit but for the space or negative going signal. In this case, the polarities of diodes X4, X5 and X6 are reversed from those in the mark or positive signal channel (X1, X2, X3). The result of the two separate circuit actions is that a voltage appears at point 32 equal to one half the difference of the mark and space signal amplitudes when alternations are occuring between mark and space conditions. If the signal remains in either polarity for a period long compared to circuit time constants, the voltage at 32 decays to zero. This voltage is the desired signal decision threshold corresponding to line 12 in FIG. 1.

Tubes V4 and V5 and associated components comprise a high gain differential amplifier such that if the input signal applied through resistor R24 to the grid 22 of V4 is positive with respect to the threshold voltage applied to the grid 24 of V5, the output $E_O$ will be positive. Correspondingly, if the signal is negative with respect to the threshold voltage, the output will be negative.

A decision threshold computer which functions to shift the input signals with respect to a fixed threshold as diagrammed in FIG. 2 is schematically illustrated in FIG. 4. It comprises a capacitor C10 and resistor R20 in series between the input terminal 40 and the output terminal 41. A similar series circuit having equal capacitor C11 and resistor R21 is connected in parallel with the first circuit. Capacitor C10 is bridged by resistor R18. An equal resistor R17 bridges capacitor C11. A rectifier X10 in series with capacitor C13 is connected to the outer terminal 42 of resistor R20 and to ground. Similarly, rectifier X11 and capacitor C12 are connected between ground and outer terminal 43 of resistor R21. Rectifiers X10 and X11 are disposed in opposite directions with respect to the input. Capacitors C12 and C13 are equal to each other but of much higher capacity than capacitors C10 and C11. Resistors R16 and R22 in series bridge resistor R18 in series with diode X10. Similarly, the respectively equivalent resistors R15 and R19 bridge resistor R17 in series with diode X11. Equal rectifiers X12 and X13 respectively bridge resistors R19 and R22. Oppositely disposed equal rectifiers X14 and X15 respectively bridge capacitors C12 and C13. As in the embodiment of FIG. 3, the elements are chosen to provide quick charge times less than the time length of the usual information bit and discharge times of very much longer duration but fast enough that the device will follow the fading rate.

The computer of FIG. 4 operates in the following manner. Initially, capacitors C10, C11, C12, and C13 are discharged. For a mark or positive signal, $E_M$, capacitor C11 is charged to the input voltage through diode X11 and C12. C12 is large compared to C11 such that the voltage on C12 does not change appreciably during the charging of C11. In a similar manner, capacitor C10 is charged through diode X10 and capacitor C13 for negative or space input, $-E_S$. Thus, for a subsequent mark input, terminal 43 is held at zero by diode X11 and C12 while terminal 42 goes to $E_M+E_S$ (the series addition of the input signal and the voltage on capacitor C10). The voltage appearing at output terminal 41 is then $\frac{1}{2}(E_M+E_S)$. Similarly, for a subsequent space input, terminal 42 is at zero potential and terminal 43 is $-E_S-E_M$. The resulting output is thus $-\frac{1}{2}(E_M+E_S)$. It is apparent that during a mark input, capacitor C13 is maintained discharged through diode X13 and R16 with diode X15 preventing C13 from being charged positive. Likewise, C12 is maintained discharged by a space input signal through the action of X12, R15, and X14.

Thus, for a signal alternating between mark and space, the output is symmetrical about zero regardless of the relative input strength.

Now assuming that the signal remains of one polarity, say $E_M$ for periods which are long compared to the selected time constants, capacitor C12 charges to input $E_M$ through resistors R15 and R19. Diode X11 now ceases to conduct. This permits capacitor C11 to discharge through resistor R17. Meanwhile, capacitor C10 discharges through resistor R18. Since there is no charge on either C10 or C11, the input is now effectively coupled directly to the output. A similar situation results from a continuous input $-E_S$; the decision criteria is seen to shift from a multiple AM to an FSK type decision on a fixed decision threshold as depicted in FIG. 2.

Figure 5:
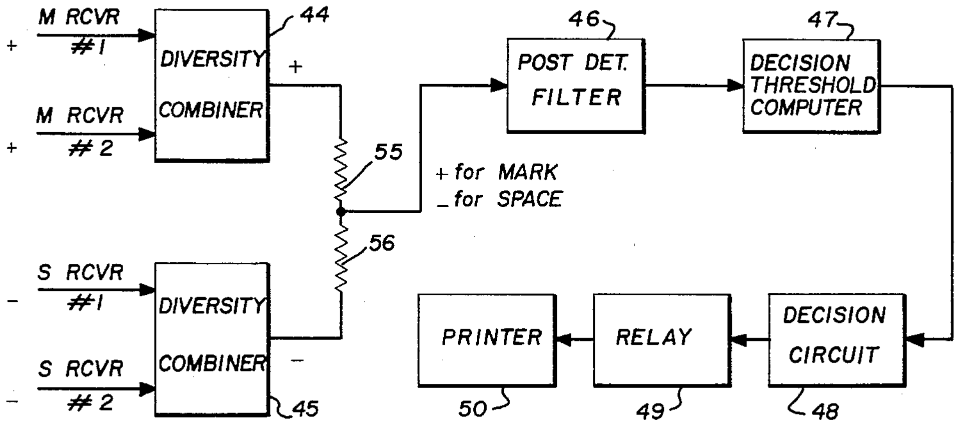
FIG. 5 is a partial block diagram of dual diversity receivers outfitted with a decision threshold computer according to the invention.

The decision threshold computers described may be used in a conventional dual diversity receiver system by insertion in the circuit at 47 as indicated in the block diagram, FIG. 5. In this figure, the mark signals from the two receivers are shown as being combined in a conventional diversity combiner 44 and the space signals in a similar apparatus 45. The outputs of the diversity combiners are fed to resistors 55 and 56. From the midpoint connection of resistors 55 and 56, the signal is fed to the post detector filter 46 and then into one of the described decision threshold computers 47. The computer output is fed to a conventional apparatus including a decision circuit 48, a relay 49, and a printer 50, recorder or other type of terminal equipment.

Figure 6:
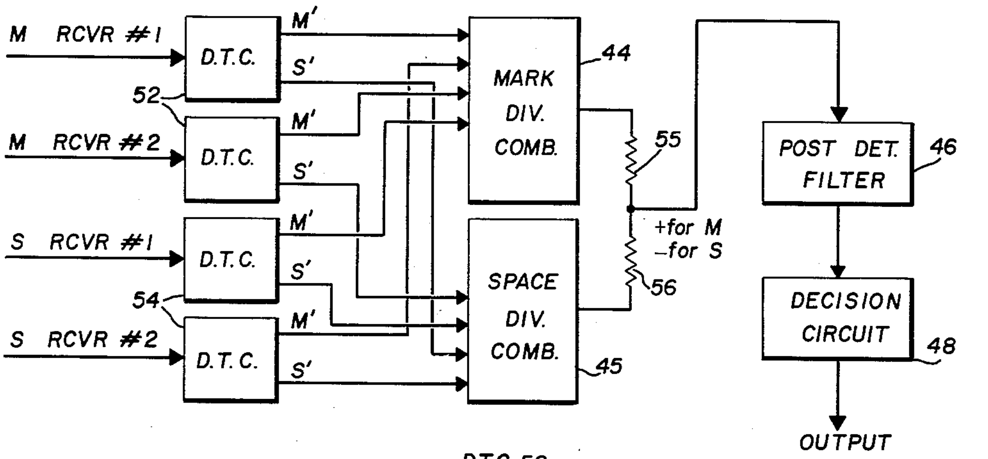
FIG. 6 is a partial block diagram of dual diversity receivers outfitted with a decision threshold computer in each channel.

If desired, a modified decision threshold computer may be inserted in the individual mark and space channels of the separate diversity receivers as shown in FIG. 6. A computer 52 is inserted in the mark channel of each receiver ahead of the mark diversity combiner 44. A slightly modified computer 54 is similarly inserted in each receiver ahead of the space diversity combiner 45. The rest of the circuit is conventional.

Figure 7:
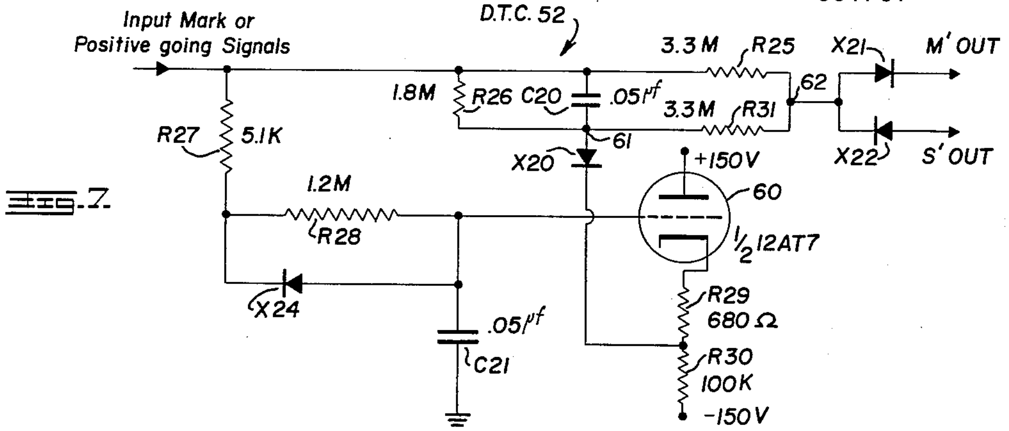
FIG. 7 is a schematic circuit of a decision threshold computer suitable for use in the mark sensing channels of the system diagrammed in FIG. 6.
Figure 8:
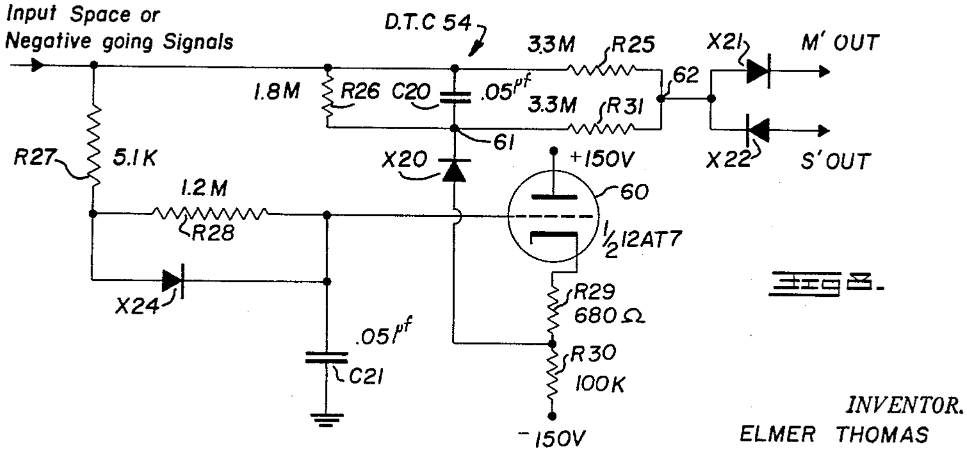
FIG. 8 is a schematic circuit of a decision threshold computer suitable for use in the space sensing channels of FIG. 6.

The circuits of modified decision threshold computers 52 and 54 are schematically shown in FIGS. 7 and 8. The two circuits are similar in arrangement and operation, differing only in the reversal of polarity of certain of the diodes. Therefore, only one circuit need be described in detail. Representative but not limiting values of the circuit elements are shown in the figures.

In each of FIGS. 7 and 8, a capacitor C20 in series with a diode X20 are connected between the computer input terminal and a tap between resistors R29 and R30 in the cathode circuit of tube 60. A pair of resistors R25 and R31 in series bridge capacitor C20. Resistor R26 also bridges C20. Resistors R25 and R31 provide an adding network. The computer has two separate branches, for mark and space outputs, provided by diodes X21 and X22. These diodes are disposed oppositely to provide different polarity output signals in the branches. Resistors R27 and R28 in series are connected between the input and the grid of tube 60. Capacitor C21 is connected between the grid and ground. Diode X24 bridges the resistor R28.

The decision threshold computer of FIG. 7 functions in the following manner: The input voltage is positive on mark and zero or slightly positive in the case of noise, for a space. Upon reception of alternate mark and space input signals, diode X20 conducts during a mark thus charging C20 to the mark input voltage, and the voltage at terminal 61 is zero. During a space, in the absence of noise, terminal 61 goes to a negative voltage approximately equal to the preceding mark voltage since diode X20 no longer conducts. Also, capacitor C21 is discharged through diode X24 and R27.

Thus, during a mark input, terminal 62 is positive and equal in amplitude to one half the mark voltage. Conversely, during a space input, terminal 62 is negative and equal in amplitude to one half the previous mark input as a result of the voltage on capacitor C20. It is now apparent that the voltage at terminal 62 alternates symmetrically about zero in a manner similar to that of the computer of FIG. 4 except that the input voltage consists of only positive going signals.

The output now consists of mark and space signals. Diodes X21 and X22 serve to separate these signals so that they may accordingly be combined as shown in FIG. 6.

Considering now a prolonged mark signal input signal, capacitor C21 charges to $E_M$ which potential is applied to the grid of tube 60. The resulting voltage at the junction of R29 and R30 prevents conduction in diode X20 permitting capacitor C20 to discharge through resistor R26. Thus, when the charge on C20 is zero, the input is directly coupled to the output. Capacitor C20 is similarly discharged for a prolonged space input. Thus, as in the computer of FIG. 4, the decision criteria is seen to shift to that required for an FSK decision in the case of a prolonged mark or space. The space or negative input computer of FIG. 8 operates in a similar manner as described for FIG. 7, in this case the capacitor C20 charges on space signals and discharges on reception of a prolonged space input signal.

It is clear from the above description of the mode of operation of the specific circuit embodiments of FIGS. 3, 4, 7 and 8 that all follow the same general method, that is the received signals are separated in distinct circuits in which the inputs are separately stored; the current input signal is then compared with the last received signal of opposite type to establish a decision threshold and yield an output proportional to their difference; and the stored signals are erased upon reception of a prolonged input signal of one type to establish a second decision threshold and yield an output proportional to the prolonged input signal.

It will be apparent from the above that the described embodiments of the invention offer many advantages in the reception of carrier type FSK signals and/or multilevel AM. Since the entire message is available on each frequency, decision ambiguity or failure need not occur unless signals on both frequencies fade simultaneously. The invention permits a decision even in the absence of one of the FSK signals. The computer approximates the missing signal from the amplitude received when the particular frequency was last transmitted and from predetermined signal fading characteristics. Thus, absence of a signal may be as significant as its presence. In the presence of frequency selective fading, the described embodiments of the invention provide the advantage of available frequency diversity improvements when the signal is shifting substantially regularly between the mark and space frequencies, that is, at a given signal to noise ratio extra orders of diversity may be obtained. The decision criteria is automatically shifted from AM to FSK when keying rates are relatively slow in order to prevent decision failure. In the event of complete fading of one signal, the computer selects the optimum decision threshold by adjustment to the AM decision criteria. During lengthy periods of interference on one frequency, the corrupted signal may be removed and the system will still operate on dual mark or dual space signal reception with two receivers.

Further advantages exist in the probability of overcoming errors introduced on weak multipath signals and in the extension to reception of digital data of all types.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. In an apparatus for reducing the error effect of fading of carrier type keying signals, the combination comprising means for receiving discrete binary signals, means for separating sequentially received signals of different type in distinct circuits, means for storing said different signals separately in said circuits, means for comparing each last received stored signal of one type to the current input signal of the other type to establish a first decision threshold, and means for erasing said stored signals upon receipt of a prolonged input signal of one type to establish a second decision threshold.

2. A variable decision threshold computer, for carrier type keying signal reception to reduce errors due to frequency selective fading, comprising at least one input adapted to receive discrete mark and space signals in varying sequence and amplitude, at least one output, means including separate circuits each including storing means for the said input signals as mark and space components, means for comparing the amplitudes of adjacent input voltages to establish a first decision threshold and yield an output signal proportional to the difference of sequential input signals when the said input signals are alternating between discrete mark and space signals, and means for erasing said stored signals upon receipt of a prolonged input signal of one type to establish a second decision threshold and yield an output signal proportional to said prolonged signal.

3. A variable decision threshold computer, for carrier type keying signal reception to reduce errors due to frequency selective fading, comprising at least one input adapted to receive discrete signals of different sense in varying sequence and amplitude, at least one output for connection to a decision circuit, means for providing an output signal substantially equal to the input signal and of the same sense during periods when the input signals alternate between positive and negative signals of equal amplitude, means for producing an output signal proportional to the difference in levels of adjacent positive and negative input signals during periods when the input signals vary in sequence and the amplitude of either of said signals is reduced by fading, and means for producing an output signal substantially equal to the input signal upon prolonged reception of an input signal of one sense.

4. A variable decision threshold computer, for carrier type keying signal reception to reduce errors due to frequency selective fading, comprising an input adapted to receive positive and negative signals in varying sequence and amplitude, an output for connecting to a decision circuit, means for setting a decision threshold at an initial level to yield an output proportional to said received positive and negative signals when they vary in sequence, means for shifting the decision threshold to a level toward the center of the positive and negative signals under signal fading conditions to obtain an output voltage proportional to the difference in potential of sequential signals of different sense, and means for returning the decision threshold to said initial level upon prolonged reception of an input signal of one sense.

5. A variable decision threshold computer, for carrier type keying signal reception to reduce errors due to frequency selective fading, comprising an input adapted to receive positive and negative signals in varying sequence and amplitudes, an output for connection to a decision circuit, means for setting a fixed decision threshold at the center of said input signals when received in varying sequence to yield an output voltage proportional in amplitude and sense to the received signals, means for shifting the received signals to center about said fixed threshold under fading conditions of the input signals to yield an output voltage proportional to the difference of potential of adjacent signals of different sense, and means for shifting prolonged signals of one sense with respect to said fixed decision threshold to yield an output voltage proportional to that of said prolonged signal.

6. A variable decision threshold computer, according to claim 4 wherein said means for setting the decision threshold at an initial level comprises a differential amplifier having one grid connected to said input, said means for shifting the decision threshold comprising a pair of parallel circuits each having a first capacitor, and a rectifier, and a resistor in series, the rectifiers being oppositely polarized, said parallel circuits being connected to said input at one end and said resistors being connected to a second grid of said differential amplifier, and said means for returning the decision threshold criteria to its initial level including a second capacitor associated with an additional rectifier so connected in each of said parallel circuits as to discharge and reduce the voltage on said resistor to zero when said first capacitor is charged by a prolonged signal.

7. A variable decision threshold computer, for carrier type keying signal reception to reduce errors due to fading, comprising an input adapted to receive positive and negative signals in varying sequence and amplitude, a differential amplifier having one grid connected to said input, an output, an anode associated with a second grid of said differential amplifier connected to said output, a pair of similar series circuits connected in parallel between said input and the second grid of said differential amplifier, each of said series circuits including a first capacitor between two rectifiers and a resistor, the rectifiers of said pair of circuits being oppositely polarized, and a second capacitor connected between each of said series circuits and ground to discharge and reduce the voltage of said resistor to zero when said first capacitor is charged upon prolonged reception of an input signal of one sense.

8. A variable decision threshold computer according to claim 7 wherein the grid cathode impedance of a triode is inserted into each of said series circuits to lower the capacitative reactance required for each of said first capacitors.

9. A variable decision threshold computer according to claim 5 wherein said means for setting a fixed decision threshold and for shifting the received signals to center about said threshold level comprises a pair of parallel circuits each having a first capacitor and resistor in series between said input and output and oppositely polarized rectifiers connected between said capacitors and ground, and said means for shifting prolonged signals of one sense includes a second capacitor inserted between each of said rectifiers and ground and associated with additional resistors so as to charge and block the rectifier to permit said first capacitor to discharge upon prolonged reception of an input signal of one sense.

10. A variable decision threshold computer according to claim 9 wherein said second capacitors are of greater capacity than the said first capacitors.

11. A variable decision threshold computer, for carrier type keying signal reception to reduce errors due to fading, comprising an input adapted to receive positive and negative signals in varying sequence and amplitude, an output, a pair of similar series circuits connected in parallel between said input and ground, each of said circuits including a first and second capacitor separated by a rectifier, said rectifiers being oppositely polarized, a resistor bridging said series circuits intermediate said capacitors, a tap on said resistor connected to said output, a second resistor bridging each of said first capacitors, a third resistor connected between each of said second capacitors and said input, a second rectifier bridging said third resistor in each circuit, and a third rectifier in each circuit bridging said second capacitor and opposing the said first rectifier.

12. A variable decision threshold computer, for carrier type keying signal reception to reduce errors due to fading, comprising an input adapted to receive discrete signals of one type, a condenser and rectifier in series connected between said input and cathode of a triode, a first and second resistor each bridging said condenser, an output connected to a tap on said second resistor, series resistors connected between said input and the grid of said triode, a second condenser between said grid and ground, and a second rectifier connected between the input and said second condenser.

13. A variable decision threshold computer, for carrier type keying signal reception to reduce errors due to fading, comprising at least one input adapted to receive discrete binary signals of mark and space type in varying sequence and amplitude, at least one output, means for providing an output voltage proportional to the difference in voltage of adjacent input signals during periods when the input signals vary in sequence, and means for producing an increased output voltage substantially equal to the input signal of one type without subtraction of the last received signal of the other type upon reception of a prolonged signal of said one type.

References Cited in the file of this patent

UNITED STATES PATENTS

| | | |
|---|---|---|
| 2,443,434 | Sprague | June 15, 1948 |
| 2,782,412 | Brockner | Feb. 19, 1957 |